(12) United States Patent
Matsumoto et al.

(10) Patent No.: US 8,169,637 B2
(45) Date of Patent: May 1, 2012

(54) DEVICE MANAGEMENT SYSTEM

(75) Inventors: Akira Matsumoto, Nagano-ken (JP);
Toshihiro Shima, Nagano-ken (JP);
Atsushi Yoshino, Nagano-ken (JP);
Takuya Abe, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1390 days.

(21) Appl. No.: 11/209,659

(22) Filed: Aug. 24, 2005

(65) Prior Publication Data
US 2006/0043166 A1 Mar. 2, 2006

(30) Foreign Application Priority Data
Aug. 25, 2004 (JP) .................. 2004-244563

(51) Int. Cl.
*G06F 3/12* (2006.01)
*G06F 15/16* (2006.01)
(52) U.S. Cl. ...................... 358/1.15; 709/224
(58) Field of Classification Search .................. None
See application file for complete search history.

(56) References Cited

U.S. PATENT DOCUMENTS

| | | | | |
|---|---|---|---|---|
| 5,400,246 A * | 3/1995 | Wilson et al. | | 700/17 |
| 6,607,314 B1 * | 8/2003 | McCannon et al. | | 400/62 |
| 7,061,633 B1 * | 6/2006 | Shima | | 358/1.15 |
| 2002/0188504 A1 * | 12/2002 | Whale | | 705/14 |
| 2004/0141201 A1 * | 7/2004 | Shima | | 358/1.15 |
| 2004/0165206 A1 * | 8/2004 | Aoki et al. | | 358/1.13 |
| 2004/0172469 A1 * | 9/2004 | Takahashi et al. | | 709/224 |
| 2005/0237565 A1 * | 10/2005 | Maeda | | 358/1.15 |
| 2005/0251554 A1 * | 11/2005 | Fong et al. | | 709/206 |
| 2006/0083521 A1 * | 4/2006 | Simpson et al. | | 399/24 |

FOREIGN PATENT DOCUMENTS

| | | |
|---|---|---|
| JP | 2000-103148 A | 4/2000 |
| JP | 2003-6134 A | 1/2003 |

* cited by examiner

*Primary Examiner* — Chan S Park
*Assistant Examiner* — Mesfin Getaneh
(74) *Attorney, Agent, or Firm* — Sughrue Mion, PLLC

(57) ABSTRACT

The serial number of a first printer in which a network board is installed before power supply of the first printer is turned is stored in the network board. The network board determines whether or not the current serial number of the first printer in which the network board is currently installed and the serial number of a second printer in which the network board is installed before the power supply of the first printer is turned ON are identical. If the two serial numbers are determined to be not identical, the network board transmits the model name of the first printer to a management server. When the management server receives the model name of the first printer, the management server transmits the configuration file associates with the model name of the first printer to the network board.

20 Claims, 9 Drawing Sheets

Fig.11A

| SERIAL NUMBER | CONFIGURATION FILE NAME |
|---|---|
| SN100 | file500.xml |
| SN110 | file600.xml |
| SN200 | file950C.xml |
| SN300 | file700C.xml |

| SERIAL NUMBER | SN100 |
|---|---|
| MODEL NAME | LP-950C |
| MONITORING INTERVAL | 10 MINUTES |
| MONITORED ITEM (1) | REMAINING YELLOW AMOUNT |
| MONITORED ITEM (2) | REMAINING MAGENTA AMOUNT |
| MONITORED ITEM (3) | REMAINING CYAN AMOUNT |
| MONITORED ITEM (4) | REMAINING BLACK AMOUNT |
| MONITORED ITEM (5) | REMAINING YELLOW PHOTO CONDUCTOR AMOUNT |
| MONITORED ITEM (6) | REMAINING MAGENTA PHOTO CONDUCTOR AMOUNT |
| MONITORED ITEM (7) | REMAINING CYAN PHOTO CONDUCTOR AMOUNT |
| MONITORED ITEM (8) | REMAINING BLACK PHOTO CONDUCTOR AMOUNT |

DEVICE MANAGEMENT SYSTEM

BACKGROUND OF THE INVENTION

1. Field of the Invention

The present invention relates to a device management system that manages a device over a network.

2. Description of the Related Art

In recent years, management systems that remotely manage a printer over a network have become increasingly popular. In this type of management system, a network board incorporated into each printer collects log information based on a configuration file in which are set monitored items that differ according to the model of the printer, and then uploads this log information to a device management apparatus. The log information includes such as the remaining amounts or the used amounts of consumables such as printer ink, print job information and the like. The network board associates the log information with other information that is able to specify the printer in which the board is installed, such as a serial number, and uploads such information to the management device. When the network board is installed in a printer of different model, the administrator manually updates the configuration file associated with the model of printer in which the network board is installed.

However, in the conventional management method, it is extremely complex and costly when a network board has been replaced with a printer of different model printer, because the administrator has to update manually the log collection parameters. Furthermore, there is a risk that the administrator may forget to update the configuration file or may update the different configuration file.

These problems are not limited to management systems in which a device management apparatus manages printers, and exist in various management systems in which a management apparatus manages devices by exchanging information with a device monitoring apparatus that monitors devices.

SUMMARY OF THE INVENTION

The present invention was carried on in view of these problems, and the purpose is to reduce the burden on the administrator by replacing easily the configuration file in which the log information collection parameters are set when a device that a device monitoring apparatus monitors has changed.

In order to resolve at least one of the above problems, as a first aspect of the present invention provides a device monitoring apparatus that is connected with a device and a management apparatus, and monitors the device. The device monitoring apparatus comprises a storage module that stores device identification information for specifying the device, an obtaining module that obtains monitoring target device identification information for specifying a monitoring target device that is targeted of monitoring, a determination module that determines whether the device identification information and the monitoring target device identification information are identical, a transmission module that transmits prescribed information for specifying monitored item configuration information to the management apparatus when the determination module determines that the device identification information and the monitoring target device identification information are not identical, wherein the monitored item configuration information includes an item for monitoring, a receiving module that receives the monitored item configuration information from the management apparatus, a monitored item storage module that stores the received monitoring item configuration information, and a monitoring module that monitors status of use of the monitoring target device based on the monitored item configuration information.

Using this construction, even when the monitoring target device has changed, the device monitoring apparatus is able to obtain the monitored item configuration information for the changed monitoring target device easily. Therefore, the burden on the administrator is able to be reduced through the use of the device monitoring apparatus of the present invention.

A management apparatus of a second aspect of the present invention is follow. A plurality of devices, a plurality of device monitoring apparatuses that monitors a device of the plurality of devices and a management apparatus are connected over a network, wherein the management apparatus comprising, a monitored item management module that manages monitored item configuration information in association with prescribed information for specifying the monitored item configuration information for monitoring, a receiving module that receives the prescribed information associated with the monitoring target device from the device monitoring apparatus, and a transmission module that transmits the monitored item configuration information associated with the monitoring target device to the device monitoring apparatus, wherein the monitored item configuration information is specified based on the prescribed information.

Using this construction, the management apparatus is able to specify the monitored item configuration information associated with a monitoring target device based on a request from the device monitoring apparatus easily. Therefore, the burden on the administrator is able to be reduced.

These and other objects, features, aspects, and advantages of the present invention will become more apparent from the following detailed description of the preferred embodiments with the accompanying drawings.

BRIEF DESCRIPTION OF THE DRAWINGS

FIG. 11A illustrates the configuration file management information in a variation of the present invention.

FIG. 11B illustrates the configuration file management information in a variation of the present invention.

DESCRIPTION OF THE PREFERRED EMBODIMENT

Embodiments of the present invention will be described below based on examples.

A1. System Construction

Figure 1:
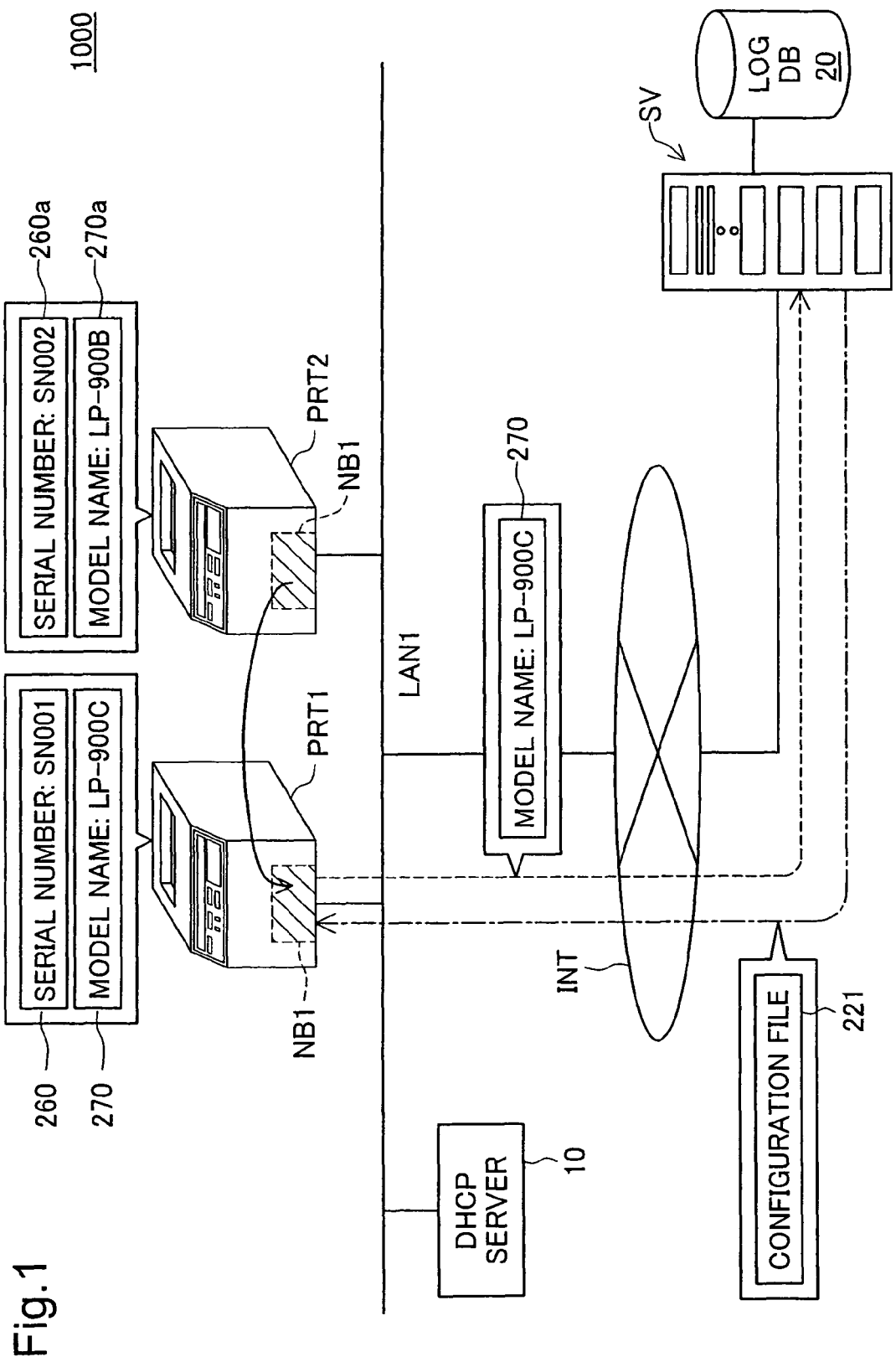
FIG. 1 illustrates the system construction of a printer management system of an embodiment.

FIG. 1 is an explanatory drawing showing the system construction of a printer management system 1000 of an embodiment. The printer management system 1000 has a management server SV, printers PRT1, PRT2, and a DHCP (Dynamic Host Configuration Protocol) server 10. The printers PRT1, PRT2 and the DHCP server 10 are connected to a local area network LAN1. The local area network LAN 1 and the management server SV are connected over the Internet INT. When power supply to the printers PRT1, PRT2 connected to the local area network LAN1 is turned ON, IP addresses are allocated thereto by the DHCP server 10. The management server SV corresponds to the 'management apparatus' of this invention, while the printers PRT1, PRT2 correspond to the 'a plurality of devices' therein.

The printer PRT2 is a monochrome printer that performs black-and-white printing. The serial number 260a of the printer PRT2 is 'SN002', while the model name 270a is 'LP-900B'. The printer PRT2 includes a network board NB1 as a network interface. The network board NB1 monitors and logs the status of use of the printer PRT2 based on a configuration file not shown. The monitored items include, for example, the remaining amounts of consumables such as ink. The network board NB1 accumulates log files comprising the collected log information in association with the serial number 260a and uploads the log files to the management server SV as appropriate. Different items are included in the configuration file for each printer serial number. In this embodiment, the network board NB1 that was installed in the printer PRT2 may be reinstalled in the printer PRT1 as shown by the solid arrow in FIG. 1.

The printer PRT1 is a color printer that performs color printing. The serial number 260 of the printer PRT1 is 'SN001', while the model name 270 is 'LP-900C'. The printer PRT1 has a network board NB1 as a network interface. The network board NB1 has been replaced from the printer PRT2. The serial number of the printer that is target for monitoring is recorded on the network board NB1 in order to specify the monitoring target printer. When the network board NB1 has been replaced from the printer PRT2 to the printer PRT1, the serial number 260a of the printer PRT2, which was the monitoring target printer prior to replacement of the network board NB1, is still recorded on the network board NB1.

The network board NB1 compares the serial number 260 of the printer PRT1 to which the network board NB1 is connected (hereinafter termed the 'current serial number 260') and the serial number 260a of the printer PRT2 recorded in the network board NB1 (hereinafter termed the 'previous serial number 260a'). In this embodiment, the current serial number 260 is 'SN001' and the previous serial number 260a is 'SN002'. If the current serial number 260 and the previous serial number 260a are different, the network board NB1 notifies the management server SV of the model name 270 of the printer PRT1 as shown by the dashed arrow in the drawing. When the management server SV receives the model name 270, the management server SV transmits the configuration file 221 associated with the model name 270 to the network board NB1 as shown by the chain line arrow in the drawing. The items to be collected in the log by the network board NB1 are included in the configuration file. The details of this process will be described below.

The network board NB1 monitors the printer PRT1 based on the received configuration file 221 and collects log information regarding the remaining ink amounts and other information pertaining to the printer PRT1.

A2. Function Blocks
A2-1. Printer Function Blocks

Figure 2:
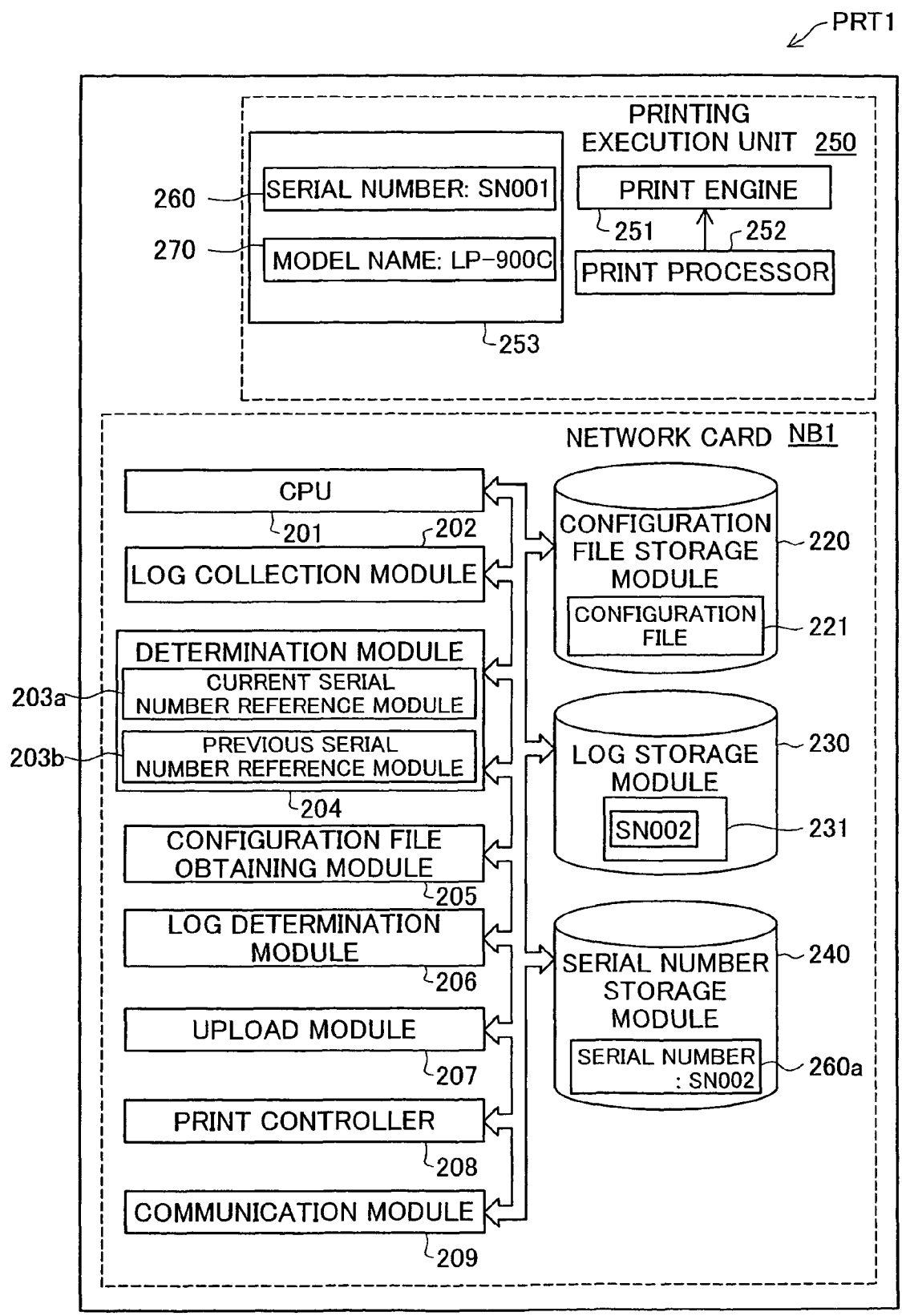
FIG. 2 illustrates the function blocks for the printer of the embodiment.

FIG. 2 is an explanatory drawing showing function blocks for the printer PRT1 of this embodiment. The printer PRT1 includes a printing module 250 and the network board NB1. The printer PRT2 has the identical construction. The printing module 250 includes a print engine 251, a print processor 252 and a non-volatile memory 253.

The print processor 252 performs processing to enable a print job received via the network board NB1 to be printed and transfers the print job to the print engine 251. The print engine 251 prints of the transferred print job by controlling the various hardware components of the printer PRT1. The serial number 260 and model name 270 of the printer PRT1 are recorded in the non-volatile memory 253.

The network board NB1 includes a CPU 201, a log collection module 202, a current serial number reference module 203a, an previous serial number reference module 203b, a determination module 204, a configuration file obtaining module 205, a log determination module 206, an upload module 207, a print controller 208, a communication module 209, a configuration file storage module 220, a log storage module 230 and a serial number storage module 240. The various function blocks are implemented via software controlled by the CPU 201. Each of these function blocks may alternatively be composed via hardware.

The current serial number reference module 203a and previous serial number reference module 203b comprise part of the determination module 204. The current serial number reference module 203a refers to the current serial number 260 recorded in the non-volatile memory 253. The previous serial number 260a is stored in the serial number storage module 240. The previous serial number 260a is 'SN002', as shown in the drawing. The previous serial number reference module 203b refers to the previous serial number 260a stored in the serial number storage module 240. The determination module 204 determines whether or not the current serial number 260 and the previous serial number 260a are identical. The current serial number reference module 203a corresponds to the 'obtaining module' of the present invention.

When the determination module 204 determines that the current serial number 260 and the previous serial number 260a are not identical, the log determination module 206 refers to the log storage module 230 and determines whether or not a log file associated with the previous serial number 260a exists. In this embodiment, as shown in the drawing, because a log file 231 associated with the previous serial number 260a ('SN002') exists in the log storage module 230, the log determination module 206 determines that a log file 231 associated with the previous serial number 260a exists.

The upload module 207 periodically uploads the log files stored in the log storage module 230 to the management server SV. Furthermore, when the determination module 206 determines that a log file 231 which is associated with the previous serial number 260a exists, the upload module 207 uploads the log file 231 to the management server SV.

When the determination module 204 determines that the current serial number 260 and the previous serial number 260a are not identical, the configuration file obtaining module 205 notifies the management server SV of the model name 270 of the printer PRT1 and obtains the configuration file associated with the model name 270 from the management server SV. The configuration file obtaining module 205 stores the obtained configuration file in the configuration file storage module 220.

The log collection module 202 determines, based on the configuration file 221 stored in the configuration file storage module 220, and with reference to a timer installed in the printer but not shown in the drawing, whether or not the time for log collection has arrived. When it is time to collect a log, the log collection module 202 collects a log of the use status of the printer PRT1 based on the monitored items set in the configuration file 221 and stores the collected log in the log storage module 230 in association with the current serial number 260. The details of the configuration file 221 are described with reference to FIG. 3

Figures 3, 4:
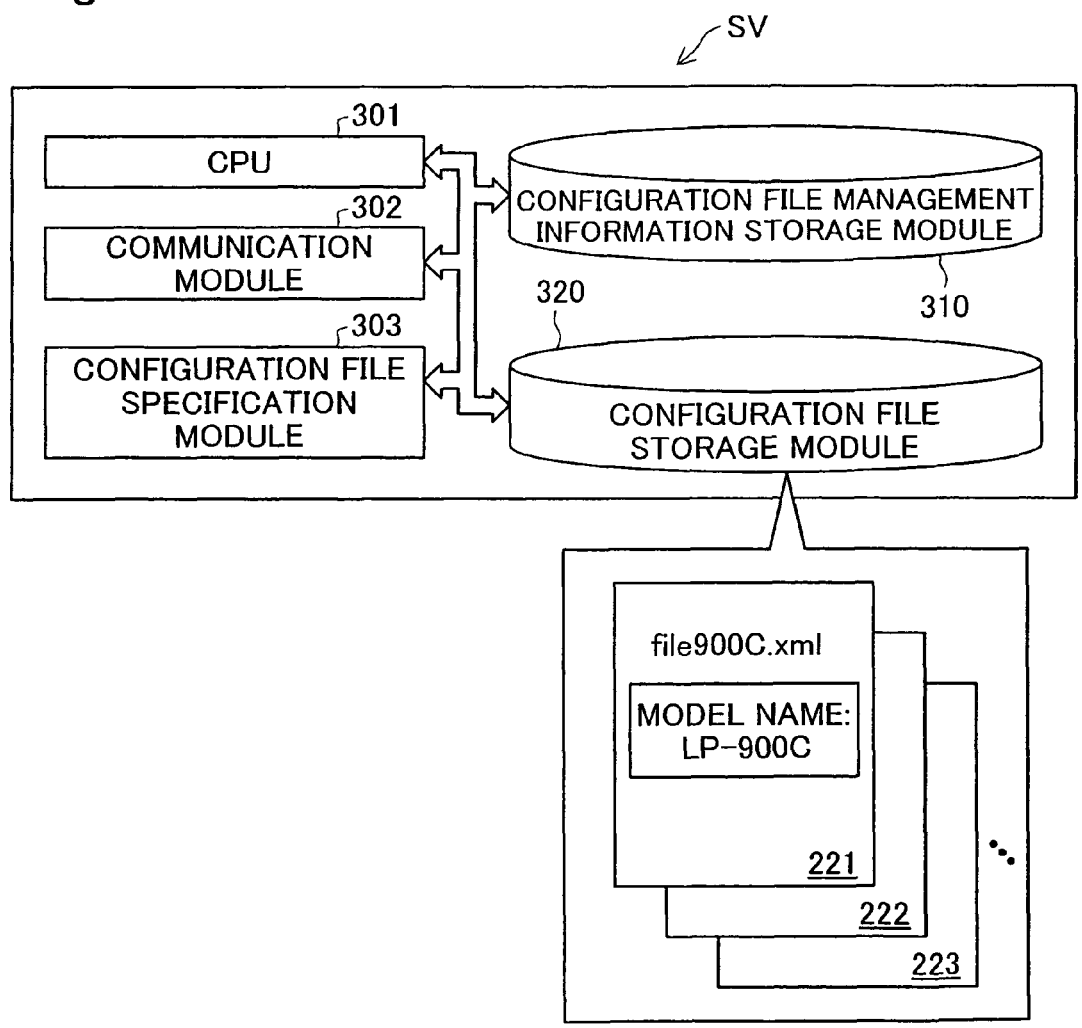
FIG. 3 illustrates the configuration file of the embodiment.
FIG. 4 illustrates the function blocks of the management server of the embodiment.

FIG. 3 is an explanatory drawing showing an example of the configuration file of this embodiment. Monitored items in connection with the monitoring of the printer PRT1 are set in the configuration file 221. The configuration file 221 is stored in the configuration file storage module 220. The configuration file 221 has the model name, the monitoring interval, and monitored items (1)-(5). The printer PRT1 is a color printer and has a single photo conductor and the four ink colors of yellow, magenta, cyan and black.

The 'Model name' indicates the model name 'LP-900C' of the printer PRT1. The 'Monitoring interval' is set at '60 minutes'. The 'Monitoring interval indicates that the log collection module 202 collects log information regarding the monitored items (1)-(5) every 60 minutes after monitoring is begun, with reference to the timer. 'Remaining yellow amount' set in the monitored item (1) indicates that the log collection module 202 monitors the remaining amount of yellow ink. Similarly, the monitored item (2) indicates that the log collection module 202 monitors the remaining amount of magenta ink, the monitored item (3) indicates that the log collection module 202 monitors the remaining amount of cyan ink, and the monitored item (4) indicates that the log collection module 202 monitors the remaining amount of black ink. Set in the monitored item (5) is 'Remaining photo conductor amount'. The monitored item (5) indicates that the log collection module 202 monitors the remaining amount of the photo conductor of the printer PRT1.

The print controller 208 prohibits the printing module 250 from printing when the determination module 204 determines that the current serial number 260 and the previous serial number 260a are not identical. Furthermore, the print controller 208 permits that the printing module 250 prints after the configuration file associated with the model name 270 of the printer PRT1 is stored in the configuration file storage module 220 by the configuration file obtaining module 205.

The communication module 209 is a so-called network interface. The communication module 209 communicates with the management server SV and other apparatuses.

A2. Management Server Function Blocks

FIG. 4 is an explanatory drawing showing an example of function blocks of the management server SV of this embodiment. The management server SV has a CPU 301, a communication module 302, a configuration file specification module 303, a configuration file management information storage module 310 and a configuration file storage module 320. Each of these function blocks is implemented via software and is controlled by the CPU 301. Each function block may alternatively be implemented via hardware, however.

The communication module 302 is a so-called network interface. The communication module 302 communicates with the network board NB1 and other components.

A plurality of configuration files 221, 222, 223 . . . associated with individual printer models are stored in the configuration file storage module 320. For example, the configuration file 221 has a file name of 'file900C.xml', and associates with the model name 'LP-900C'.

Configuration file management information 331 is stored in the configuration file management information storage module 310. Configuration file management information 331 has the configuration file for monitoring a printer in association with the printer's serial number. The configuration file management information 331 will be described in detail below with reference to FIG. 5.

Figure 5:
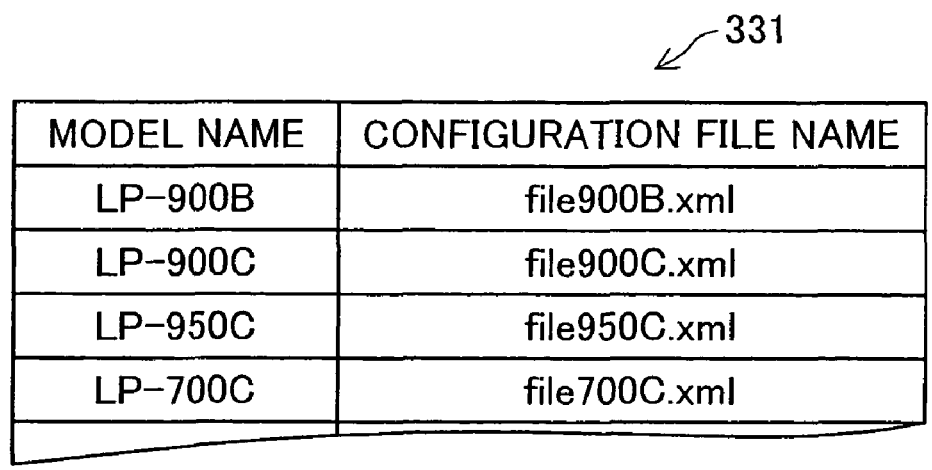
FIG. 5 illustrates the configuration file management information in the embodiment.

FIG. 5 is an explanatory drawing showing an example of configuration file management information in this embodiment. The configuration file management information 331 has the two items of 'Model name' and 'Configuration file name'. For example, the model name of 'LP-900B' indicates that a printer that the model name is 'LP-900B' is monitored based on the monitored items set in the configuration file having the file name 'file900B.xml'.

Returning to FIG. 4, when configuration file specification module 303 received the model name 270 of the printer PRT1 from the network board NB1, the configuration file specification module 303 specifies the configuration file name associated with the model name 270 with reference to the configuration file management information storage module 310 and transmits the specified configuration file to the network board NB1. As shown in this embodiment, when configuration file specification module 303 received the model name 'LP-900C', the configuration file specification module 303 transmits the configuration file 221 having the configuration file name 'file900C.xml' to the network board NB1.

Figure 6:
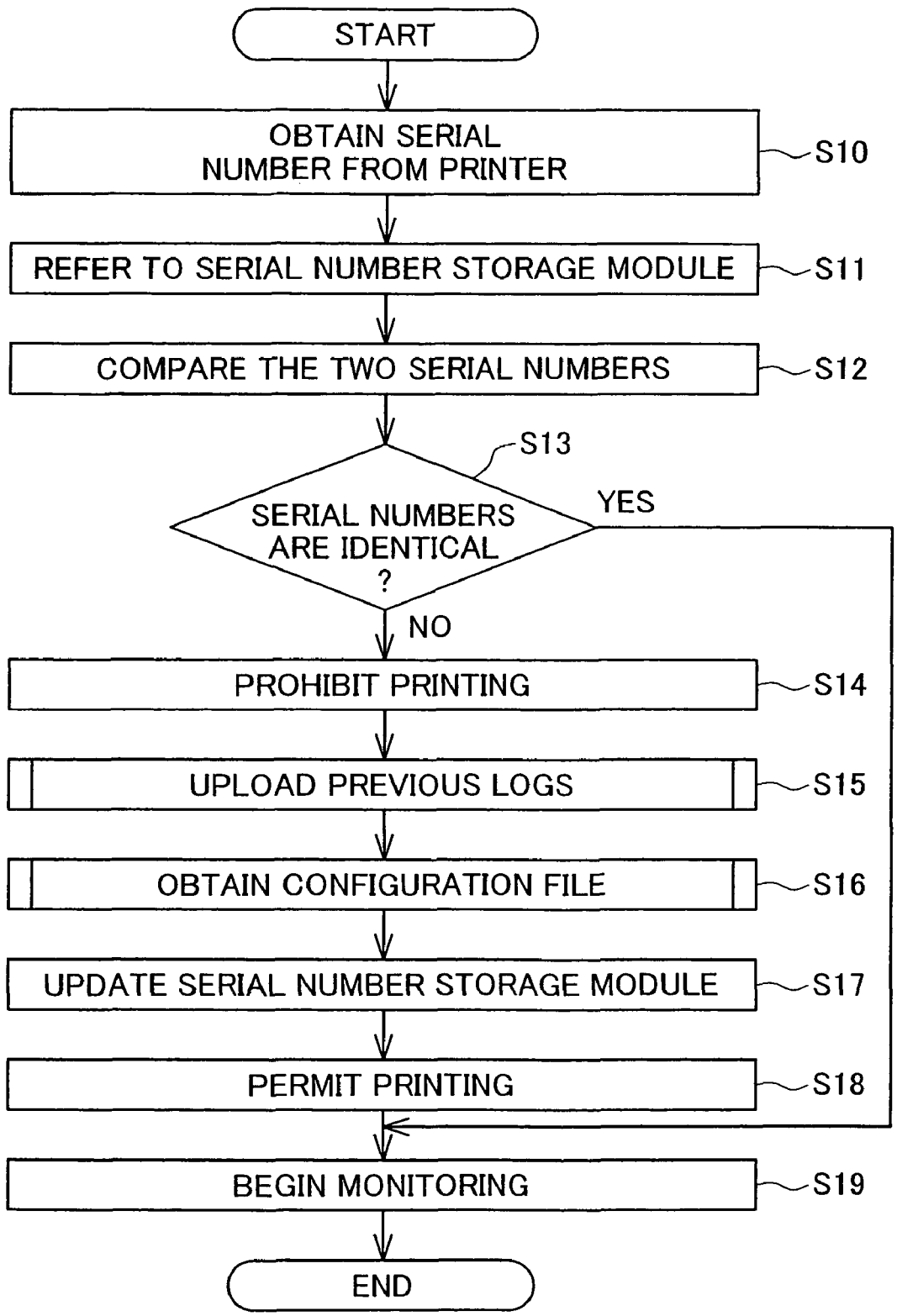
FIG. 6 illustrates a flow chart to explain the printer monitoring process of the embodiment.

A3-1. Monitoring Process:

FIG. 6 is a flow chart describing the process by which the network board NB1 monitors the printer PRT1 in this embodiment. The network board NB1 begins this process when the power supply to the printer PRT1 is turned ON.

The network board NB1 obtains the serial number 260 of the printer PRT1 from the printing module 250 (step S10). The network board NB1 obtains the previous serial number 260a with reference to the serial number storage module 240 (step S11).

The network board NB1 compares the serial number 260 and the previous serial number 260a (step S12) and determines whether or not the two serial numbers are identical (step S13). If the two serial numbers are identical (YES in step S13), the network board NB1 begins monitoring of the printer PRT1 (step S19). By determination whether or not the two serial numbers are identical when power supply of the printer is turned ON, the processing burden is able to be reduced without the need to repeat the operation of obtaining a configuration file.

If the two serial numbers are not identical (NO in step S13), the network board NB1 prohibits the printer from printing (step S14), uploads any prior logs associated with the previous serial number to the management server SV (step S15), and obtains the configuration file associated with the printer PRT1 in which the network board NB1 has been newly installed (step S16). The process to upload the prior logs is described in detail with reference to FIG. 7, while the process to obtain the configuration file is described in detail with reference to FIG. 8.

A3-2. Upload Process

Figure 7:
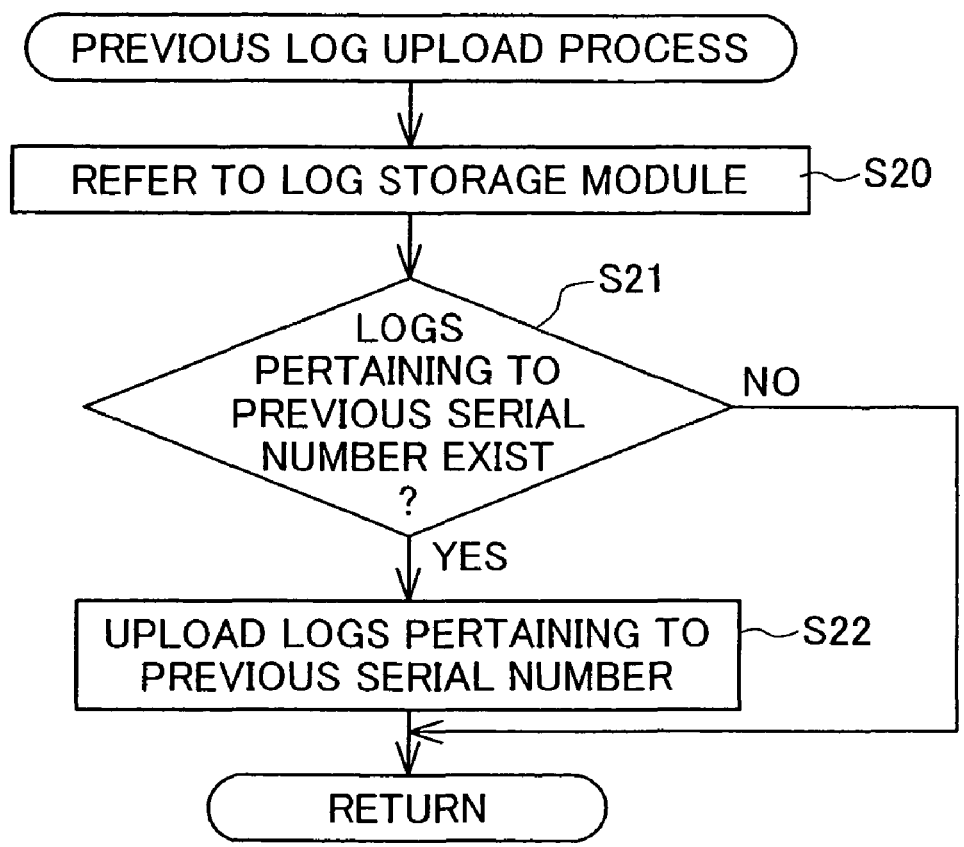
FIG. 7 illustrates a flow chart to explain the prior log upload process of the embodiment.

FIG. 7 is a flow chart to describe the prior log upload process of this embodiment. It shows in detail the processing of step S15 in FIG. 6.

The network board NB1 refers to the log storage module 230 (step S20) and determines whether or not a log associated with the previous serial number 260a exists (step S21). If a log associated with the previous serial number 260a exists (YES in step S21), the network board NB1 uploads the log file 231 associated with the previous serial number to the management server SV (step S22). If a log associated with the previous serial number does not exist (NO in step S21), the upload process ends.

A3-3. Configuration File Obtaining Process

Figure 8:
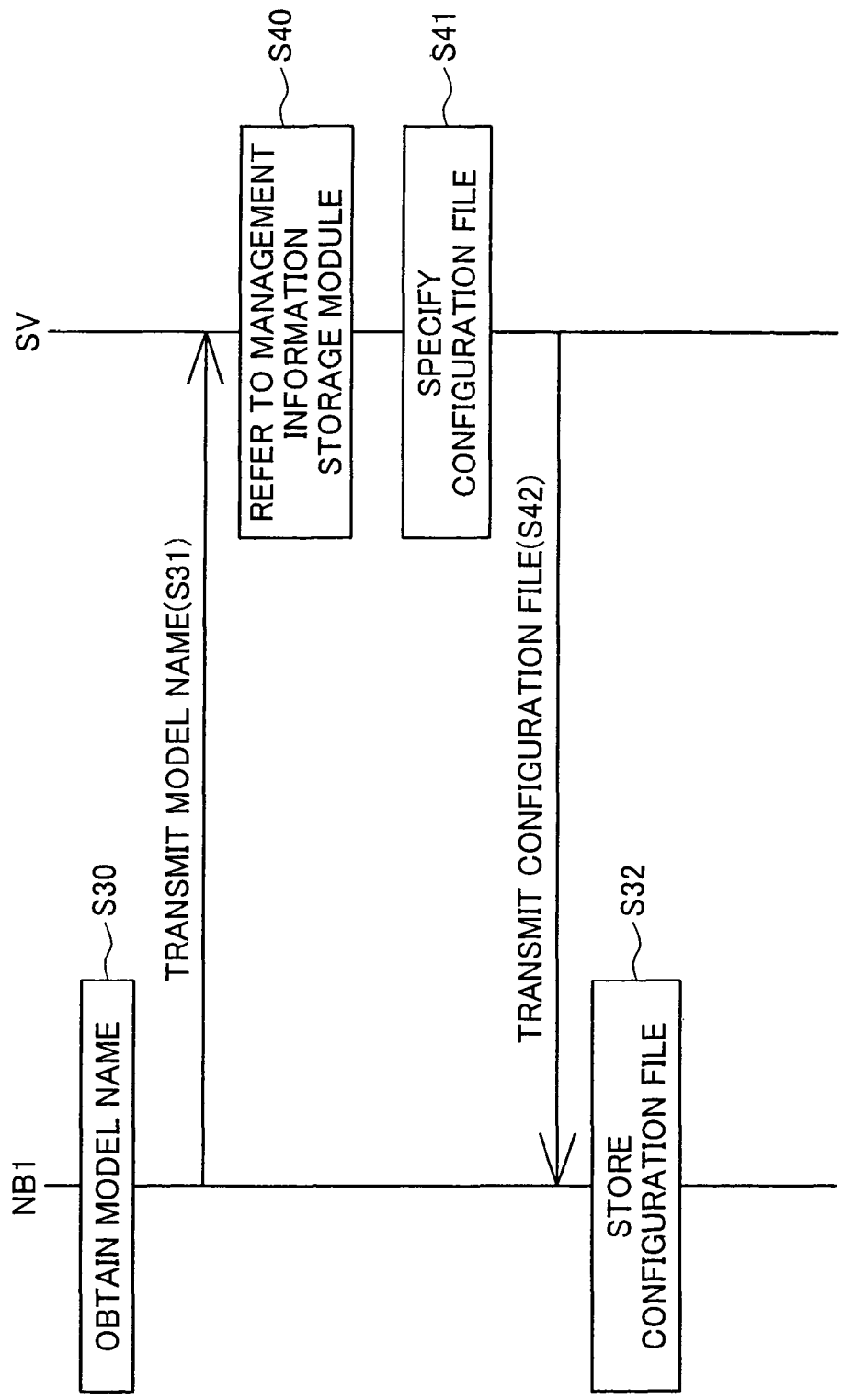
FIG. 8 illustrates a timing chart describing the process to obtain a configuration file in the embodiment.

FIG. 8 is a timing chart showing the configuration file obtaining process of this embodiment. It shows in detail the processing of step S16 in FIG. 6.

The network board NB1 obtains the model name 270 of the printer PRT1 from the printing module 250 (step S30) and transmits the model name 270 to the management server SV (step S31).

When the management server SV receives the model name 270, the management server SV refers to the configuration file management information storage module 310 (step S40) and specifies the configuration file associated with the received model name 270 (step S41). The management server SV transmits the specified configuration file 221 to the network board NB1 (step S42).

When the configuration file 221 transmitted from the management server SV is received, the network board NB1 stores the configuration file 221 in the configuration file storage module 220 (step S32).

Returning to FIG. 6, when the network board NB1 obtains the configuration file, the network board NB1 stores the serial number 260 of the printer PRT1 in the serial number storage module 240 (step S17). In other words, the serial number storage module 240 is updated by rewriting the serial number 'SN002' stored therein to 'SN001'.

The network board NB1 then permits the printer PRT1 to print (step S18) and begins monitoring (step S19).

A3-4. Log Collection Process

Figures 9, 10:
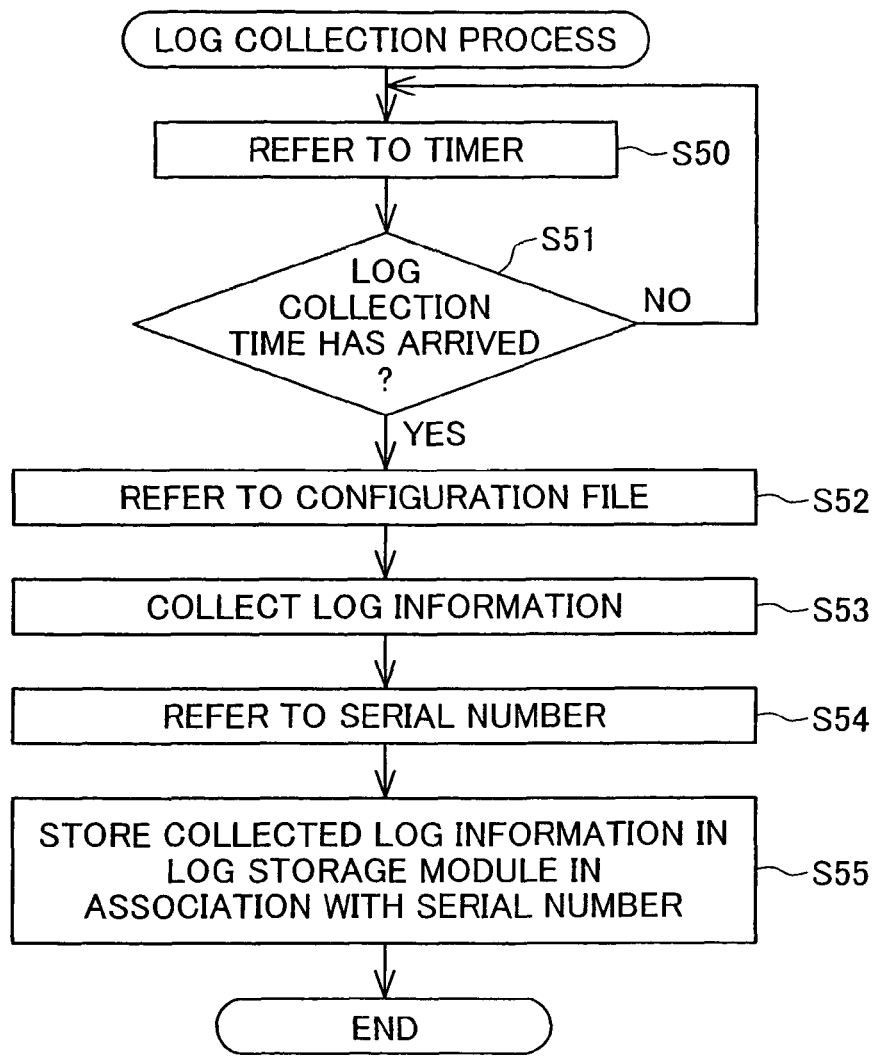
FIG. 9 illustrates a flow chart showing the log collection process of the embodiment.
FIG. 10 illustrates is the configuration file in a variation of the present invention.

FIG. 9 is a flow chart to explain the log collection process of this embodiment. It shows the processing that occurs after the monitoring of step S19 of FIG. 6 has begun.

When the monitoring process begins, the network board NB1 refers to the timer (step S50) and determines whether or not the log collection time has arrived (step S51). If the log collection time has arrived (YES in step S51), the network board NB1 refers to the configuration file 221 (step S52) and collects the remaining inks and other log information for the printer PRT1.

The network board NB1 refers to the serial number stored in the serial number storage module 240 (step S54) and stores the collected log information and the referenced serial number in the log storage module 230 in association with each other (step S55).

According to the management system of the embodiment described above, even where the printer that is targeted for monitoring by the network board NB1 has changed from the printer PRT2 to the printer PRT1, the network board NB1 is able to easily obtain the configuration file associated with the printer PRT1 after this change. Therefore, the burden on the administrator is reduced.

Moreover, by uploading the logs of the printer PRT2 stored in the log storage module 230 to the management server SV, the network board NB1 is able to notify of the status of use of the printer PRT2 that was monitored prior to the change in the printer subject to monitoring by the network board NB1. Therefore, the administrator is able to keep track of such use easily and accurately.

Furthermore, according to this embodiment, because the network board NB1 is able to permit the printing after the network board NB1 obtains the configuration file, the log collection based on a configuration file that does not associate with the printer PRT1 targeted for monitoring at the time of log collection is able to be avoided.

B. Variations

While various embodiments of the present invention were described above, the present invention is not limited to these implementations, and naturally various constructions within the essential scope of the invention are acceptable. For example, in the above embodiments, the apparatuses to be managed by the management server SV were printers, but they may comprise other types of devices connected to a network, such as copying machines, projectors, or computer peripherals.

(1) In the above embodiment, the printer PRT1 is a color printer, and the configuration file 221 associated with the model 'LP-900C' of the printer PRT1 has monitored items including the remaining amounts of a plurality of colors of ink used during color printing, but the present invention is not limited to this implementation.

FIG. 10 is an explanatory drawing showing an example of the configuration file of the variation of the present invention. This configuration file 222 pertains to a model 'LP-900B' capable of only monochrome printing. The 'LP-900B' printer contains only black ink. The model name 'LP-900B' of the printer PRT1 is set in the 'Model name'. The 'Monitoring interval' is set at '60 minutes', indicating that the log collection module 202 collects log information regarding the items set in the monitored items (1), (2) every 60 minutes after monitoring is begun, based on the timer incorporated in the printer. 'Remaining black amount' is set in the monitored item (1), indicating that the remaining amount of black ink is to be monitored. Set in the monitored item (2) is 'Remaining photo conductor amount', indicating that the remaining amount of the photo conductor of the printer is to be monitored.

(2) In the above embodiment, the configuration file is specified based on the model name, but the present invention is not limited to this implementation. For example, the configuration file may be specified based on the serial number. The configuration file management information storage module 310 of the management server SV and the configuration file management information 331a in such a case are described with reference to FIG. 11A.

FIG. 11A is an explanatory drawing showing an example of the configuration file management information of a variation of the present invention. The configuration file management information 331a stored in the configuration file management information storage module 310 has the two items of 'Serial number' and 'Configuration file name'. For example, the printer having the serial number 'SN100' is to be monitored based on the monitored items set in the configuration file having the configuration file name 'file500.xml'. The configuration file 223 having the configuration file name 'file500.xml' is described in detail with reference to FIG. 11B.

The printer having the serial number 'SN100' is a color printer, and has four ink colors and four photo conductors. As shown in the configuration file 223 in FIG. 11B, 'SN100' is set in 'Serial number', and 'LP-950C' is set in 'Model name'. Furthermore, '10 minutes' is set in 'Monitoring interval', and based on a timer built into the printer, the log collection module 202 collects log information regarding the items set in the monitored items (1)-(8) every 10 minutes after monitoring is begun. In addition, the monitored items (1)-(4) indicate that the remaining amounts of the four ink colors are to be monitored. The monitored items (5)-(8) indicate that the remaining amounts of the photo conductors associated with the four ink colors are to be monitored.

In this way, the network board NB1 is able to obtain a configuration file easily even when the configuration file is associated with a serial number.

Although the present invention has been described and illustrated in detail, it is clearly understood that the same is by way of illustration and example only and is not to be taken by way of limitation, the spirit and scope of the present invention being limited only by the terms of the appended claims.

The Japanese patent applications as the basis of the priority claim of this application are incorporated in the disclosure here of by reference:

(1) Japanese Patent Application No. 2004-244563 (filing data: Aug. 25, 2004).

What is claimed is:

1. A device monitoring apparatus that monitors a device and is connected with a management apparatus through a network, the device monitoring apparatus comprising:
   a storage module that stores device identification information for specifying the device to which the device monitoring apparatus is detachably attached;
   an obtaining module that obtains monitoring target device identification information for specifying a monitoring target device that is targeted of monitoring;
   a determination module that determines, on the basis of whether the device identification information and the monitoring target device identification information are identical, whether the monitoring target device has changed;
   a transmission module that transmits information for specifying the changed monitoring target device to the management apparatus when the determination module determines that the monitoring target device is changed;
   a receiving module that receives monitored item configuration information from the management apparatus, wherein the monitored item configuration information includes a monitoring item for the changed monitoring device;
   a monitored item storage module that stores the received monitoring item configuration information; and
   a monitoring module that monitors status of use of the monitoring target device based on the monitored item configuration information.

2. The device monitoring apparatus according to claim 1, further comprising:
   a use status storage module that stores the status of use of the monitoring target device in association with the device identification information; and
   a notification module that notifies the management apparatus of the status of use of the device associated with the monitoring target device identification information when the determination module determines that the device identification information and the monitoring target device identification information are not identical.

3. The device monitoring apparatus according to claim 2, wherein
   the monitoring target device is a printer; and
   the device monitoring apparatus further comprises:
   a print controller that prohibits the printer from printing when the determination module determines that the device identification information and the monitoring target device identification information are not identical.

4. The device monitoring apparatus according to claim 3, wherein
   the print controller permits the printing after the monitored item configuration information that is received from the management apparatus is stored in the monitored item storage module.

5. The device monitoring apparatus according to claim 1, wherein the monitoring target device is a printer; and
   the device monitoring apparatus further comprises:
   a print controller that prohibits the printer from printing when the determination module determines that the device identification information and the monitoring target device identification information are not identical.

6. The device monitoring apparatus according to claim 5, wherein
   the print controller permits the printing after the monitored item configuration information that is received from the management apparatus is stored in the monitored item storage module.

7. The device monitoring apparatus according to claim 1, wherein the transmission module transmits a model name of the monitoring target device as the information for specifying the changed monitoring target device.

8. The device monitoring apparatus according to claim 1, wherein the transmission module transmits a serial number of the monitoring target device as the information for specifying the changed monitoring target device.

9. The device monitoring apparatus according to claim 1, wherein the determination module carries on the determination when power supply of the monitoring target device is turned ON.

10. The device monitoring apparatus according to claim 1, further comprising:
    a registration module that registers the monitoring target device identification information in the storage module when the determination module determines that the device identification information and the monitoring target device identification information are not identical.

11. The device monitoring apparatus of claim 1, wherein the management apparatus that is connected with the device monitoring apparatus through the network comprises:
    a monitored item management module that manages monitored item configuration information in association with information for specifying the monitored item configuration information for monitoring;
    a receiving module that receives the information associated with the monitoring target device from the device monitoring apparatus; and
    a transmission module that transmits the monitored item configuration information associated with the monitoring target device to the device monitoring apparatus, wherein the monitored item configuration information is specified based on the information.

12. The device monitoring apparatus according to claim 1, wherein the device monitoring apparatus is detachably installed in the monitoring target device.

13. The device monitoring apparatus according to claim 1, wherein the monitoring item is a monitored characteristic of the monitoring target device and is monitored by the monitoring module of the device monitoring apparatus such that the monitoring module collects, from the monitoring target device, a log of the status of use pertaining to the monitoring item set in the monitored item configuration information.

14. The device monitoring apparatus according to claim 13, wherein the monitoring item is an amount of a consumable item used by the monitoring target device.

15. The device monitoring apparatus according to claim 1, wherein the monitored item configuration information is a configuration file, the management apparatus stores a plurality of configuration files in a monitored item management module, each of the plurality of configuration files corresponding to a different type of monitoring target device, the information for specifying the changed monitoring target device indicates a type of the monitoring target device, and the management apparatus selects one of the plurality of configuration files to transmit to the receiving module of the device monitoring apparatus based on the type of the monitoring target device transmitted from the transmission module of the device monitoring apparatus.

16. A device management system that monitors a device, a device monitoring apparatus being a plurality of device monitoring apparatuses and a management apparatus are connected through a network, wherein each of the device monitoring apparatuses individually monitors each of a plurality of devices and the management apparatus manages the devices, the device management system comprising:

each of the device monitoring apparatus includes:
a monitored item storage module that stores monitored item configuration information that includes a monitored item for monitoring a device of the plurality of the devices;
a monitoring module that monitors status of use of the device based on the monitored item configuration information;
a storage module that stores device identification information for specifying the device;
an obtaining module that obtains monitoring target device identification information for specifying a monitoring target device that is targeted of monitoring;
a determination module that determines, on the basis of whether the device identification information and the monitoring target device identification information are identical, whether the monitoring target device has changed when power supply of the monitoring target device is turned ON; and
a transmission module that transmits information for specifying the changed monitoring target device to the management apparatus when the determination module determines that the monitoring target device is changed;
the management apparatus includes:
a monitored item storage module that stores monitored item configuration information associated with the device;
a transmission module that transmits the monitored item configuration information associated with the monitoring target device to the device monitoring apparatus, wherein the monitored item configuration information is specified based on the information,
the monitored item storage module of each the device monitoring apparatus stores the monitored item configuration information transmitted from the management apparatus, wherein the monitored item configuration information includes a monitoring item for the changed monitoring device, and
the monitoring module of each the device monitoring apparatus implements the monitoring based on the monitored item configuration information, wherein each of the device monitoring apparatuses is detachably attached to a different one of the plurality of devices, including the monitoring target device, such that each of the device monitoring apparatuses individually monitors each of a plurality of devices.

17. The device management system according to claim 16, wherein each of the device monitoring apparatuses is detachably installed in a different one of the plurality of devices, including the monitoring target device.

18. A device monitoring method that is carried out by a device monitoring apparatus which monitors a device, the device monitoring apparatus being connected with a device management apparatus, through a network, the device monitoring method comprising:

obtaining monitoring target device identification information for specifying a monitoring target device that is targeted of monitoring and to which the device monitoring apparatus is detachably attached;
determining, on the basis of whether the monitoring target device identification information and device identification information are identical, whether the monitoring target device has changed, wherein the device identification information is prestored in a storage module;
transmitting information for specifying the changed monitoring target device to the management apparatus when the monitoring target device determined to be changed by the determining;
receiving monitored item configuration information from the management apparatus, wherein the monitored item configuration information includes a monitoring item for the changed monitoring device;
storing the received monitored item configuration information in a monitored item storage module; and
monitoring state of use of the monitoring target device based on the monitored item configuration information.

19. The device monitoring method of claim 18, wherein the device management apparatus is connected with a plurality of device monitoring apparatuses that individually monitors each of devices, and the device management apparatus:

managing monitored item configuration information in association with information for specifying the monitored item configuration information for monitoring;
receiving the information for specifying the changed monitoring target device from the device monitoring apparatus; and
transmitting the monitored item configuration information associated with the monitoring target device to device monitoring apparatus, wherein the monitored item configuration information is specified based on the information for specifying the changed monitoring target device.

20. The device monitoring method of claim 18, wherein the device monitoring apparatus is detachably installed in the monitoring target device.

* * * * *